United States Patent

Kobayashi et al.

Patent Number: 5,241,080
Date of Patent: Aug. 31, 1993

[54] PROCESS FOR STABILIZING DIBENZYLIDENESORBITOLS AND COMPOSITION THEREOF

[75] Inventors: Tadashi Kobayashi, Kanagawa; Hiroaki Matsuno, Kumamoto; Shoji Obuchi, Fukuoka, all of Japan

[73] Assignee: Mitsui Toatsu Chemicals, Inc., Tokyo, Japan

[21] Appl. No.: 904,488

[22] Filed: Jun. 25, 1992

[30] Foreign Application Priority Data

Jul. 9, 1991 [JP] Japan .................. 3-167917

[51] Int. Cl.$^5$ .......................... C07D 319/04
[52] U.S. Cl. ...................... 549/201; 549/364
[58] Field of Search ................ 549/364, 201

[56] References Cited

FOREIGN PATENT DOCUMENTS

| 53-5165 | 1/1978 | Japan . |
| 57-21440 | 2/1982 | Japan . |
| 57-185287 | 11/1982 | Japan . |
| 60-32791 | 2/1985 | Japan . |
| 60-42385 | 3/1985 | Japan . |
| 62-4289 | 1/1987 | Japan . |
| 1-126352 | 5/1989 | Japan . |

*Primary Examiner*—Nicky Chan
*Attorney, Agent, or Firm*—Burns, Doane, Swecker & Mathis

[57] ABSTRACT

A process for stabilizing dibenzylidenesorbitols comprising incorporating 0.05–20 pts. wt. sorbic acid and/or potassium sorbate in 100 pts. wt. dibenzylidenesorbitol represented by the following formula,

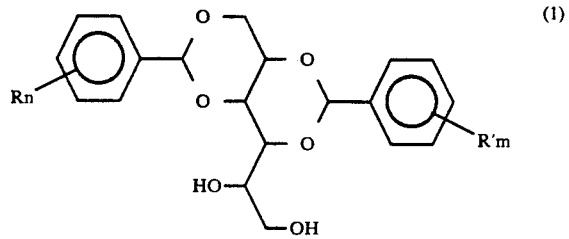

and a stabilized dibenzylidenesorbitol composition formed thereby. The storage stability of dibenzylidenesorbitols is thus greatly improved.

9 Claims, No Drawings

PROCESS FOR STABILIZING DIBENZYLIDENESORBITOLS AND COMPOSITION THEREOF

BACKGROUND OF THE INVENTION a) Field of the Invention

The present invention relates to a process for stabilizing dibenzylidenesorbitols and a composition thereof. More particularly, it relates to a process for stabilizing dibenzylidenesorbitols whereby the increase of benzaldehydes over time is suppressed, and to a dibenzylidenesorbitol composition.

b) Description of the Related Art

Dibenzylidenesorbitols, when blended in small amounts with polyolefin resins, particularly with polyethylene, polypropylene or copolymers composed primarily of these resins, have the effect of improving the transparency of the resins, and hence they are useful compounds as additives to the resins in the area of molding various containers which demand transparency. Further, they are useful compounds also as gelling agents for a variety of organic solvents.

However, dibenzylidenesorbitols are relatively insufficient in stability so that they sometimes eliminate benzaldehydes to give out a nasty smell during storage or processing and cause the molded articles to assume an aldehyde smell or a color, thus raising a large difficulty depending on the use of the molded articles and obstructing the increase of their demand.

Further, even when dibenzylidenesorbitols are so purified that the smell can not be detected, their decomposition takes place by the action of temperature, water, etc. during storage and hence has been responsible for the nasty smell.

To solve the above-described problems, the following processes have been studied and disclosed.

There are disclosed processes which comprise mixing a dibenzylidenesorbitol with a lower aliphatic alcohol or lower aliphatic ketone under heating in Japanese Patent Laid-Open Nos. 5165/1978 and 185287/1982 and processes which comprise treating it with hydroxylamine or phenylhydrazine in Japanese Patent Laid-Open Nos. 32791/1985 and 42385/1985. However, all of these processes merely remove benzaldehydes contained as impurities and do not improve the stability to the decomposition during storage.

Japanese Patent Laid-Open No. 4289/1987 discloses sorbitol derivative compositions improved in thermal stability which are formed by adding nonaromatic organic amines to sorbitol derivatives. However, in the field where the compositions are used as additives to resins to prepare food containers, it is concerned if the safety of the containers is obstructed by the amines.

Japanese Patent Laid-Open Nos. 21440/1982 and 126352/1989 disclose a composition formed by covering the surface of a solid powder of a dibenzylidenesorbitol or di-substituted-benzylidenesorbitol derivative with a saturated higher fatty acid such as behenic acid. Here, it is described that mere addition is less effective and hence the surface must be covered with a surfactant or the like. Therefore, the production process of the composition is complicated and moreover it is necessary to use a relatively large amount of the higher fatty acid, i.e., 5-50 parts by weight of a higher fatty acid for each 95-50 parts by weight of a dibenzylidenesorbitol.

In the processing of a polyolefin resin, it has generally been adopted to blend 0.1 part by weight of a metallic salt of a carboxylic acid, such as calcium stearate, with 100 parts by weight of the resin, but this process can not improve the smell given off from the molded articles when a dibenzylidenesorbitol is added to the resin so as to make them transparent.

SUMMARY OF THE INVENTION

It is an object of the present invention to provide a process for stabilizing dibenzylidenesorbitols which can suppress significantly the increase of benzaldehydes during storage and a stabilized dibenzylidenesorbitol composition.

The present inventors have found that the aldehyde smell or color of the molded articles is correlated with the amount of benzaldehydes contained in dibenzylidenesorbitols prior to being used for processing, and hence have made intensive investigations into a process for removing benzaldehydes contained in dibenzylidenesorbitols and a process for preventing their increase during storage. As a result, it has been found that the increase of benzaldehydes can be prevented by incorporating a specific amount of sorbic acid and/or potassium sorbate in a dibenzylidenesorbitol, leading to completion of the present invention.

Namely, the first invention of the present invention provides a process for stabilizing dibenzylidenesorbitols which comprises incorporating 0.05-20 parts by weight of sorbic acid and/or potassium sorbate in 100 parts by weight of a dibenzylidenesorbitol represented by the following formula (1),

TABLE 1

| | Content of benzaldehydes (ppm) | |
|---|---|---|
| | before test | after test |
| Example 1 | 11 | 11 |
| Example 2 | 12 | 13 |
| Example 3 | 8 | 10 |
| Example 4 | 12 | 12 |
| Comp. Example 1 | 11 | 45 |
| Comp. Example 2 | 12 | 50 |
| Comp. Example 3 | 8 | 42 |
| Comp. Example 4 | 12 | 30 |
| Comp. Example 5 | 11 | 28 |
| Comp. Example 6 | 8 | 30 |

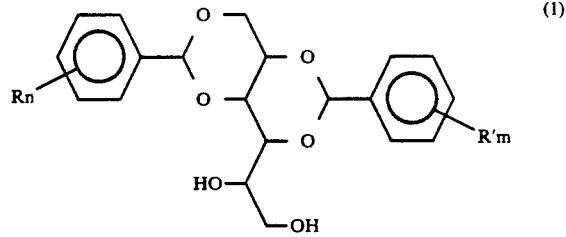

(1)

wherein R and R' represent independently an atom or group selected from the group consisting of a hydrogen atom, halogen atom, alkyl group with a carbon number of 1-8 and alkoxy group with a carbon number of 1-8 and n and m each stand for an integer of 1 to 3. The second invention provides a composition comprising a dibenzylidenesorbitol with sorbic acid and/or potassium sorbate incorporated in the same manner.

When the above stabilized dibenzylidenesorbitol composition of the present invention is used as an additive to resins such as polyolefins, it is possible to render their molded articles, transparent and also make products therefrom having very little smell.

DETAILED DESCRIPTION OF THE INVENTION

The dibenzylidenesorbitols of the formula (1) used in the present invention may include, for instance, compounds having the same kind of benzylidene groups such as 1,3-2,4-dibenzylidenesorbitol, 1,3-2,4-di(p-methylbenzylidene)sorbitol, 1,3-2,4-di(p-ethylbenzylidene)sorbitol, 1,3-2,4-di(p-chlorobenzylidene)sorbitol and 1,3-2,4-bis(dimethylbenzylidene)sorbitol; and compounds having different kinds of benzylidene groups such as 1,3-benzylidene-2,4-p-methylbenzylidenesorbitol, 1,3-benzylidene-2,4-p-ethylbenzylidenesorbitol, 1,3-benzylidene-2,4-p-chlorobenzylidenesorbitol, 1,3-p-methylbenzylidene-2,4-benzylidenesorbitol, 1,3-p-methylbenzylidene-2,4-p-chlorobenzylidenesorbitol, 1,3-p-methylbenzylidene-2,4-p-ethylbenzylidenesorbitol, 1,3-p-ethylbenzylidene-2,4-benzylidenesorbitol, 1,3-p-ethylbenzylidene-2,4-p-methylbenzylidenesorbitol and 1,3-p-ethylbenzylidene-2,4-p-chlorobenzylidenesorbitol.

The sorbic acid and/or potassium sorbate used in the composition of the present invention is publicly known as a preservative for foods, having the effect of suppressing the propagation of microorganisms such as germs and bacteria to prevent foodstuffs from rotting, but has never been known to have the effect of preventing the decomposition of dibenzylidenesorbitols. This is the effect first confirmed in the present invention.

The composition of the present invention is obtained by incorporating 0.05-20 parts by weight, preferably 0.2-20 parts by weight, of sorbic acid and/or potassium sorbate in 100 parts by weight of a dibenzylidenesorbitol. If the amount added is less than 0.05 parts by weight, the intended effect cannot be obtained satisfactorily. Any amounts more than 20 parts by weight unfavorably give rise to the bleeding of the additive in the molded articles or the reduction in transparency of the molded articles, though having the effect of preventing the formation of aldehydes, when the composition is used as an additive to the resins.

When sorbic acid and/or potassium sorbate is incorporated in a dibenzylidenesorbitol, it is allowable to mix the both components directly. However, it is also advisable to mix them in an alcoholic solvent such as methanol or ethanol and then remove the solvent by distillation. It is further allowable to prepare an aqueous emulsion thereof by using a surfactant and cover the surface of a dibenzylidenesorbitol with the emulsion. Sufficient effects can be obtained by the above processes.

As the polyolefin resins for which the composition of the present invention is used as an additive, may be mentioned polypropylene, low density polyethylene, high density polyethylene, ethylene-propylene copolymer, etc. The amount of the additive in such a use is in the range of 0.05-1 part by weight per 100 parts by weight of the polyolefin resin.

It has been found that with the composition of the present invention, its variation over time can be suppressed significantly during storage as compared with the compositions of the prior art. Moreover, it has also been found surprisingly that products of very little smell may result from the molded articles formed by the injection or extrusion molding of polyolefin resins, which are rendered transparent by incorporating the dibenzylidenesorbitol composition suppressed over time and thus have a reduced content of benzaldehydes.

The present invention will be described more specifically with reference to the following examples.

EXAMPLE 1

A sample was prepared by mixing 100 parts by weight of 1,3-2,4-dibenzylidenesorbitol with 15 parts by weight of potassium sorbate at room temperature for 3 hours in a ball mill.

EXAMPLE 2

In a flask were charged 50 parts by weight of 1,3-2,4-di(p-ethylbenzylidene)sorbitol, 1 part by weight of potassium sorbate and 80 parts by weight of methanol. They were mixed at room temperature for 2 hours and the methanol was removed in a vacuum. The contents were taken out of the flask and further dried to obtain a sample.

EXAMPLE 3

In a flask were charged 100 parts by weight of 1,3-2,4-di(p-methylbenzylidene)sorbitol, 0.2 part by weight of sorbic acid and 120 parts by weight of methanol. They were mixed at room temperature for 4 hours and the methanol was removed in a vacuum. The contents were taken out of the flask and further dried to obtain a sample.

EXAMPLE 4

A sample was prepared in the same manner as in Example 2 by using 1.5 parts by weight of sorbic acid and 1.5 parts by weight of potassium sorbate in place of 1 part by weight of potassium sorbate.

COMPARATIVE EXAMPLES 1-3

In Examples 1-3 were respectively prepared dibenzylidenesorbitols with no potassium sorbate or sorbic acid added.

COMPARATIVE EXAMPLE 4

In Example 2, a sample was prepared by using 0.005 part by weight of potassium sorbate.

COMPARATIVE EXAMPLE 5

In Example 1, a sample was prepared by using 22 parts by weight of stearic acid.

COMPARATIVE EXAMPLE 6

1,3-2,4-Dibenzylidenesorbitol was treated with hydroxylamine hydrochloride in the manner as described in the example of Japanese Patent Laid-Open No. 32791/1985.

Namely, 0.5 part by weight of hydroxylamine hydrochloride was dissolved in a small quantity of water in a flask, and the solution was neutralized by adding thereto 0.5 part by weight of sodium carbonate. The resulting solution was mixed well with 500 parts by weight of methanol, to which 50 parts by weight of 1,3-2,4-dibenzylidenesorbitol was added. The contents were agitated so that the dibenzylidenesorbitol was dispersed well in a milky or creamy state.

The dispersed liquid was heated under stirring on a hot bath at 85° C. for 2 hours and then added with 1 liter of water. The resulting dispersed liquid was filtered and washed twice with water. The cake thus obtained was dried at 85° C. for 6 hours in a dryer.

Stability Test

Stability tests were carried out using the foregoing samples and the results are shown in Table 1.

In the stability tests, the samples were kept in a room at a temperature of 25°-30° C. and a humidity of 50-60% RH for one month, and the contents of benzaldehydes were analyzed by liquid chromatography.

TABLE 1

|  | Content of benzaldehydes (ppm) | |
| --- | --- | --- |
|  | before test | after test |
| Example 1 | 11 | 11 |
| Example 2 | 12 | 13 |
| Example 3 | 8 | 10 |
| Example 4 | 12 | 12 |
| Comp. Example 1 | 11 | 45 |
| Comp. Example 2 | 12 | 50 |
| Comp. Example 3 | 8 | 42 |
| Comp. Example 4 | 12 | 30 |
| Comp. Example 5 | 11 | 28 |
| Comp. Example 6 | 8 | 30 |

What is claimed is:

1. A stabilized dibenzylidenesorbitol composition comprising 100 parts by weight of a dibenzylidenesorbitol represented by the following formula (1),

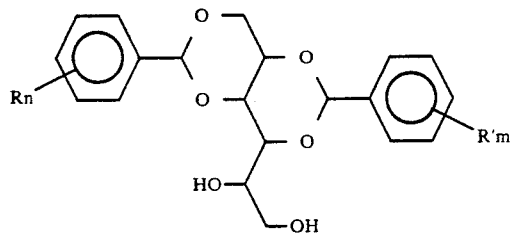

wherein R and R' are independently an atom or group selected from the group consisting of a hydrogen atom, halogen atom, alkyl group with a carbon number of 1-8 and alkoxy group with a carbon number of 1-8 and n and m each stand for an integer of 1 to 3, and 0.05-20 parts by weight of sorbic acid and/or potassium sorbate incorporated therein.

2. The stabilized dibenzylidenesorbitol composition of claim 1 wherein the dibenzylidenesorbitol is selected from the group consisting of 1,3-2,4-dibenzylidenesorbitol, 1,3-2,4-di-p-methylbenzylidene)-sorbitol, 1,3-2,4-di(p-ethylbenzylidene)sorbitol, 1,3-2,4-di(p-chlorobenzylidene)sorbitol and 1,3-2,4-bis(dimethylbenzylidene)-sorbitol.

3. The stabilized dibenzylidenesorbitol composition of claim 1 wherein the dibenzylidenesorbitol is selected from the group consisting of 1,3-benzylidene-2,4-p-methylbenzylidenesorbitol, 1,3-benzylidene-2,4-p-ethylbenzylidenesorbitol, 1,3-benzylidene-2,4--chlorobenzylidenesorbitol, 1,3p-methylbenzylidene-2,4-benzylidenesorbitol, 1,3-p-methylbenzylidene-2,4-p-chloro-benzylidenesorbitol, 1,3-p-methylenzylidene-2,4p-ethyl-benzylidenesorbitol, 1,3-p-ethylbenzylidene-2,4-benzylidene-sorbitol, 1,3-p-ethyl-benzylidene-2,4-p-methylbenzylidenesorbitol and 1,3-p-ethylbenzylidene-2,4-p-chlorobenzylidenesorbitol.

4. The stabilized dibenzylidenesorbitol composition of claim 1 wherein the dibenzylidenesorbitol is 1,3-2,4-dibenzylidenesorbitol.

5. The stabilized dibenzylidenesorbitol composition of claim 1 wherein the dibenzylidenesorbitol is 1,3-2,4-di(p-ethylbenzylidene)sorbitol.

6. The stabilized dibenzylidenesorbitol composition of claim 1 wherein the dibenzylidenesorbitol is 1,3-2,4-di(p-methylbenzylidene)sorbitol.

7. The stabilized dibenzylidenesorbitol composition of claim 1 wherein the amount of sorbic acid and/or potassium sorbate is 0.2 to 20 parts by weight.

8. The stabilized dibenzylidenesorbitol composition of claim 1 wherein sorbic acid is incorporated with the dibenzylidenesorbitol.

9. The stabilized dibenzylidenesorbitol composition of claim 1 wherein potassium sorbate is incorporated with the dibenzylidenesorbitol.

* * * * *

UNITED STATES PATENT AND TRADEMARK OFFICE
CERTIFICATE OF CORRECTION

PATENT NO. : 5,241,080
DATED : August 31, 1993
INVENTOR(S) : Tadashi KOBAYASHI et al It is certified that error appears in the above-identified patent and that said Letters Patent is hereby corrected as shown below:

Claim 3, column 6, line 14, "4--" should be -- 4-p --.

Claim 3, column 6, line 15, "1,3p" should be -- 1,3-p --.

Signed and Sealed this

Twelfth Day of July, 1994

Attest:

BRUCE LEHMAN

*Attesting Officer*   Commissioner of Patents and Trademarks